United States Patent
Long et al.

(10) Patent No.: US 11,429,783 B2
(45) Date of Patent: Aug. 30, 2022

(54) AUGMENTED NATURAL LANGUAGE GENERATION PLATFORM

(71) Applicant: STATS LLC, Chicago, IL (US)

(72) Inventors: Adam Long, Chicago, IL (US); Nick Haynes, Chicago, IL (US); Dan Salo, Chicago, IL (US); Heather Dahm, Chicago, IL (US); Jacob McCright, Chicago, IL (US); Michael Dillon, Chicago, IL (US); Hannah Deters, Chicago, IL (US); Anup Khadka, Chicago, IL (US)

(73) Assignee: STATS LLC, Chicago, IL (US)

( * ) Notice: Subject to any disclaimer, the term of this patent is extended or adjusted under 35 U.S.C. 154(b) by 0 days.

(21) Appl. No.: 17/039,172

(22) Filed: Sep. 30, 2020

(65) Prior Publication Data
US 2021/0097232 A1    Apr. 1, 2021

Related U.S. Application Data (60) Provisional application No. 62/908,235, filed on Sep. 30, 2019.

(51) Int. Cl.
*G06F 8/38*     (2018.01)
*G06F 40/186*   (2020.01)
*G06F 40/205*   (2020.01)

(52) U.S. Cl.
CPC .......... *G06F 40/186* (2020.01); *G06F 40/205* (2020.01)

(58) Field of Classification Search
CPC .............................. G06F 40/186; G06F 40/205
See application file for complete search history.

(56) References Cited

U.S. PATENT DOCUMENTS

| | | | | |
|---|---|---|---|---|
| 5,033,009 A | * | 7/1991 | Dubnoff | G06F 40/174 715/205 |
| 6,751,562 B1 | * | 6/2004 | Blackett | G05B 19/4185 702/61 |

(Continued)

FOREIGN PATENT DOCUMENTS

WO    2017/003889    1/2017

OTHER PUBLICATIONS

PCT International Application No. PCT/US20/53560, International Search Report and Written Opinion of the International Searching Authority, dated Jan. 12, 2021, 7 pages.

*Primary Examiner* — Hassan Mrabi
(74) *Attorney, Agent, or Firm* — DLA Piper LLP (US)

(57) ABSTRACT

A computing system receives a request to generate one or more narrative frameworks for a worksheet. The worksheet is hosted by a third party server. The computing system interfaces with the third party server to retrieve data associated with the worksheet. The computing system infers attributes of the worksheet from the retrieved data. The attributes correspond to a type of data represented in the worksheet. The computing system generates a narrative template for the one or more narrative frameworks. The computing system generates one or more data variables for the one or more narrative frameworks based on the generated narrative template. The computing system constructs the one or more narrative frameworks by selectively retrieving data from the worksheet for each data variable of the one or more data variables in the narrative framework.

18 Claims, 6 Drawing Sheets

(56) References Cited

U.S. PATENT DOCUMENTS

| Patent/Pub No. | Date | Inventor | Classification |
|---|---|---|---|
| 6,961,641 B1* | 11/2005 | Forth | G06Q 50/06 700/295 |
| 7,313,620 B2* | 12/2007 | Odhner | G06Q 10/06 709/226 |
| 8,694,352 B1* | 4/2014 | Hawkins | G06Q 10/06 705/7.15 |
| 9,400,777 B2* | 7/2016 | Oshlag | G06F 40/18 |
| 10,509,858 B1* | 12/2019 | Smith Devine | G06F 8/71 |
| 10,558,981 B1* | 2/2020 | Wang | G06Q 30/00 |
| 2002/0194221 A1* | 12/2002 | Strong | G06F 40/186 715/238 |
| 2003/0204756 A1* | 10/2003 | Ransom | H02H 1/0061 713/300 |
| 2004/0107025 A1* | 6/2004 | Ransom | G06Q 50/06 700/286 |
| 2004/0125133 A1* | 7/2004 | Pea | G09B 5/06 715/751 |
| 2004/0138834 A1* | 7/2004 | Blackett | G06Q 50/06 702/62 |
| 2004/0193329 A1* | 9/2004 | Ransom | H04L 63/20 700/286 |
| 2005/0144437 A1* | 6/2005 | Ransom | G06F 1/3209 713/151 |
| 2007/0094062 A1* | 4/2007 | Tracy | H04L 41/147 705/7.25 |
| 2007/0143661 A1* | 6/2007 | Machalek | G06F 40/18 715/206 |
| 2008/0077941 A1* | 3/2008 | Holmes | G06F 9/543 719/326 |
| 2008/0126407 A1* | 5/2008 | Shimaoka | G06F 8/10 |
| 2010/0325173 A1* | 12/2010 | Haley | G06F 16/288 707/804 |
| 2011/0185305 A1* | 7/2011 | Lai | G06F 40/18 715/772 |
| 2012/0047100 A1* | 2/2012 | Lehner | G06F 40/103 706/46 |
| 2012/0054590 A1* | 3/2012 | Oh | G06F 40/18 715/212 |
| 2012/0231441 A1* | 9/2012 | Parthasarathy | G09B 7/02 434/362 |
| 2012/0282587 A1* | 11/2012 | Lofthus | G09B 7/00 434/335 |
| 2013/0232026 A1* | 9/2013 | Katzman | G06Q 30/0621 705/26.5 |
| 2014/0025404 A1* | 1/2014 | Jackson | G06Q 40/08 705/4 |
| 2015/0089340 A1* | 3/2015 | Logan | G06F 40/18 715/212 |
| 2015/0089475 A1* | 3/2015 | Geng | G06F 8/71 717/121 |
| 2015/0142740 A1* | 5/2015 | Behuria | G06F 40/18 707/634 |
| 2015/0179081 A1* | 6/2015 | Bernardin | G09B 7/00 434/188 |
| 2016/0004683 A1* | 1/2016 | Paraschivescu | G06F 40/18 715/212 |
| 2016/0078017 A1 | 3/2016 | Allen et al. | |
| 2016/0086085 A1 | 3/2016 | Sweeney et al. | |
| 2017/0031350 A1* | 2/2017 | Dew | G05B 19/4097 |
| 2017/0120479 A1* | 5/2017 | Acworth | B28D 1/22 |
| 2018/0329987 A1 | 11/2018 | Tata et al. | |
| 2019/0012308 A1* | 1/2019 | Dvorak | G06F 16/903 |
| 2019/0034400 A1* | 1/2019 | Alda | G06F 9/54 |
| 2019/0066664 A1* | 2/2019 | Miller | G10L 19/018 |
| 2019/0188350 A1* | 6/2019 | Sarli | G06F 30/39 |
| 2019/0228372 A1* | 7/2019 | Saylor | G06F 30/20 |
| 2019/0236125 A1* | 8/2019 | Loeppky | G06F 40/186 |
| 2020/0150938 A1* | 5/2020 | Stachura | G06F 40/18 |
| 2020/0409947 A1* | 12/2020 | Seiden | G06F 16/248 |
| 2021/0034614 A1* | 2/2021 | Kothari | G06F 16/254 |
| 2021/0035069 A1* | 2/2021 | Parikh | G06Q 10/06313 |
| 2021/0232536 A1* | 7/2021 | Nag | G06F 16/168 |
| 2021/0397420 A1* | 12/2021 | Stachura | G06F 8/30 |

* cited by examiner

AUGMENTED NATURAL LANGUAGE GENERATION PLATFORM

CROSS-REFERENCE TO RELATED APPLICATIONS

This application claims priority to U.S. Application Ser. No. 62/908,235, filed Sep. 30, 2019, which is hereby incorporated by reference in its entirety.

FIELD OF THE DISCLOSURE

The present disclosure generally relates to an augmented natural language generation platform and a method of operating the same.

BACKGROUND

The unprecedented rise of big data has revolutionized the intelligence industry, with trillions of gigabytes of data currently existing. In response to this influx of data, analysts and data scientists have created highly complex and congested dashboards to help analyze and interpret the massive amounts of data they typically have on hand. As a result, even the most experienced data scientists may struggle to adequately communicate the insights gained from the plurality of charts and graphs that were generated.

SUMMARY

In some embodiments, a method is disclosed herein. A computing system receives a request to generate one or more narrative frameworks for a worksheet. The worksheet is hosted by a third party server. The computing system interfaces with the third party server to retrieve data associated with the worksheet. The computing system infers attributes of the worksheet from the retrieved data. The attributes correspond to a type of data represented in the worksheet. The computing system generates a narrative template for the one or more narrative frameworks. The computing system generates one or more data variables for the one or more narrative frameworks based on the generated narrative template. The computing system constructs the one or more narrative frameworks by selectively retrieving data from the worksheet for each data variable of the one or more data variables in the narrative framework.

In some embodiments, a non-transitory computer readable medium is disclosed herein. The non-transitory computer readable medium includes instructions which, when executed by a computing system, cause the computing system to perform operations. The operations include receiving, by a computing system, a request to generate one or more narrative frameworks for a worksheet. The worksheet is hosted by a third party server. The operations further include interfacing, by the computing system, with the third party server to retrieve data associated with the worksheet. The operations further include inferring, by the computing system, attributes of the worksheet from the retrieved data. The attributes correspond to a type of data represented in the worksheet. The operations further include generating, by the computing system, a narrative template for the one or more narrative frameworks. The operations further include generating, by the computing system, one or more data variables for the one or more narrative frameworks based on the generated narrative template. The operations further include constructing, by the computing system, the one or more narrative frameworks by selectively retrieving data from the worksheet for each data variable of the one or more data variables in the narrative framework.

In some embodiments, a system is disclosed herein. The system includes a processor and a memory. The memory has programming instructions stored thereon, which, when executed by the processor, performs operations. The operations include receiving a request to generate one or more narrative frameworks for a worksheet. The worksheet is hosted by a third party server. The operations further include interfacing with the third party server to retrieve data associated with the worksheet. The operations further include inferring attributes of the worksheet from the retrieved data. The attributes correspond to a type of data represented in the worksheet. The operations further include generating a narrative template for the one or more narrative frameworks. The operations further include generating one or more data variables for the one or more narrative frameworks based on the generated narrative template. The operations further include constructing the one or more narrative frameworks by selectively retrieving data from the worksheet for each data variable of the one or more data variables in the narrative framework.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

No matter how much data an organization can collect and process, at the end of the day, it is only as useful as the decisions that are gleaned from that data. Modern analytics dashboards and visualizations can help organize and arrange complex sets of data for interpretation. However, these dashboards are typically unable to generate actionable recommendations from the data. Extracting actual insights out of the various charts and graphs of a dashboard remains a very time extensive and subjective process.

One or more techniques described herein provides an augmented natural language generation engine for use with data visualization software. For example, one or more techniques described herein provide an augmented natural language generation engine that works in conjunction with data visualization software to create highly targeted, dynamic, and compelling reports based on data managed by the data visualization software.

Figure 1:
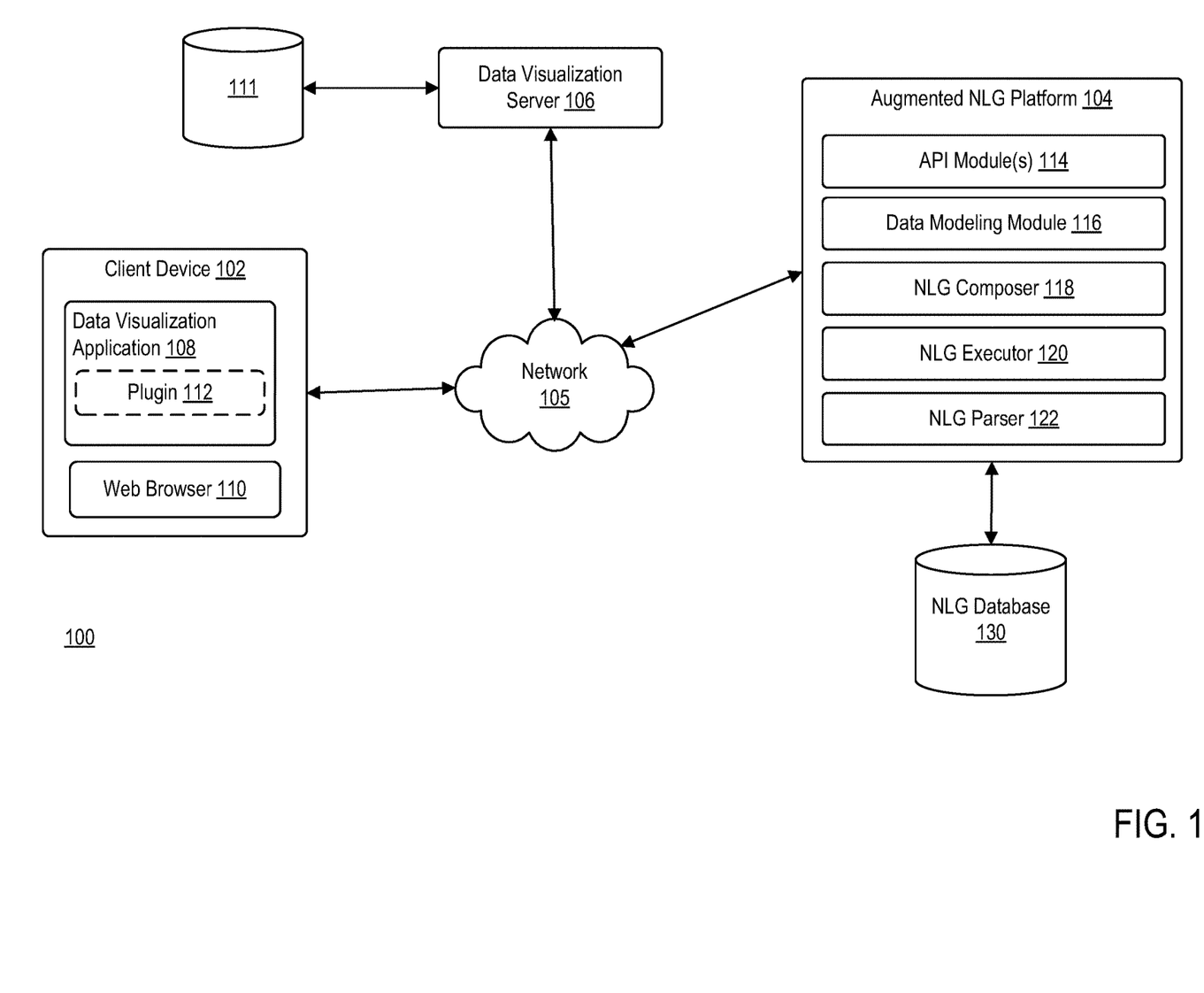
FIG. 1 is a block diagram illustrating a computing environment, according to example embodiments.

FIG. 1 is a block diagram illustrating a computing environment 100, according to example embodiments. Computing environment 100 may include a client device 102, a augmented natural language generation platform 104, and an data visualization server 106 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Client device 102 may be operated by a user. For example, client device 102 may be a mobile device, a tablet, a desktop computer, or any computing system having the capabilities described herein. Users may include, but are not limited to, individuals such as, for example, subscribers, clients, prospective clients, or customers of an entity associated with augmented natural language generation platform 104, such as individuals who have obtained, will obtain, or may obtain a product, service, or consultation from an entity associated with augmented natural language generation platform 104.

Client device 102 may include at least data visualization application 108. Data visualization application 108 may be representative of a stand-alone mobile or desktop data visualization software. Exemplary data visualization software may include, but is not limited to, Tableau, Sisense, Qlik, Plotly, Power BI, MicroStrategy, and the like. As illustrated, via data visualization application 108, client device 102 may access functionality of data visualization server 106. For example, while interacting with data visualization application 108, a user may access various data sheets stored in database 111 by transmitting a request to data visualization server 106 via data visualization application 108.

Data visualization application 108 may include plugin 112. Plugin 112 may be associated with augmented natural language generation platform 104. For example, via plugin 112, client device 102 may access functionality of augmented natural language generation platform 104 directly within data visualization application 108. Client device 102 may communicate over network 105 to access functionality of augmented natural language generation platform 104. The content that is displayed to client device 102 may be transmitted from augmented natural language generation platform 104 to client device 102, and subsequently processed by data visualization application 108 for display through a graphical user interface (GUI) of client device 102.

In some embodiments, client device 102 may include web browser 110. Via web browser 110, client device 102 may access functionality of data visualization server 106 via one or more hypertext transfer protocol (HTTP) requests. In other words, in addition to accessing functionality of data visualization server 106 via a desktop or mobile application (e.g., data visualization application 108), a user may also access functionality of data visualization server 106 via a browser. In such embodiments, the browser-based data visualization application may include an integration with augmented natural language generation platform 104.

Augmented natural language generation platform 104 may include application programming interface (API) module 114, data modeling module 116, NLG composer 118, NLG executor 120, and NLG parser 122. Each or API module 114, data modeling module 116, NLG composer 118, NLG executor 120, and NLG parser 122 may be comprised of one or more software modules. The one or more software modules may be collections of code or instructions stored on a media (e.g., memory of augmented natural language generation platform 104) that represent a series of machine instructions (e.g., program code) that implement one or more algorithmic steps. Such machine instructions may be the actual computer code the processor of augmented natural language generation platform 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Augmented natural language generation platform 104 may be representative of a back-end complement to the front end integration of plugin 112 with data visualization application 108. Augmented natural language generation platform 104 may be configured to execute three functions: data modeling, etude processing, and etude execution. In operation, when a user interacts with plugin 112 via data visualization application 108, plugin 112 may prompt the user to select a target data set. The target data set may correspond to a data set associated with a user's account with the data visualization software. Upon receiving a selection of a target data set, plugin 112 may interface with augmented natural language generation platform 104. In some embodiments, plugin 112 may interface with augmented natural language generation platform 104 via one or more APIs managed by API module 114.

Upon receiving the target data set, data modeling module 116 may be configured to analyze the data set and extract information therefrom. In some embodiments, data modeling module 116 may be configured to infer data column types from the data set. In some embodiments, data modeling module 116 may be configured to infer detailed metadata for any columns and tables in the data set. This defines the type of data associated with the data set.

Generally, the data modeling performed by data modeling module 116 may be performed in two steps. During the first step, data modeling module 116 may attempt to cast a given string literal to an instance of an object with a certain type. If the cast is successful, the corresponding type may be returned. If however, the attempt fails, an error may be raised. In some embodiments, data modeling module 116 may loop over an ordered list of types until a successful cast is found. Data modeling module 116 may create a table schema based on the type inference. The table schema may be representative of a record of the identified types for each column.

The second step of the data modeling process may include three substeps: infer, aggregate, and discover. During the infer substep, data modeling module 116 may transform the rows of a table object into columns, with each column being assigned a subtype based on its type.

During the aggregate sub step, data modeling module 116 may generate metrics based on the data. For example, data modeling module 116 may generate metrics, such, as but not limited to, count of null, sums based on unique records, totals, mean, median, standard deviation, and the like.

During the discover substep, data modeling module 116 may identify patterns among the table columns. To do so, data modeling module 116 may analyze the interactions between columns, instead of focusing on the individual columns themselves. In some embodiments, data modeling module 116 may identify hierarchies. Hierarchies may correspond to a series of one-to-many relationships among the columns of the table. These relationships may be represented by a directed graph, with keys parents and children. In some embodiments, this analysis may include columns with the string subtype. In some embodiments, data modeling module 116 may identify correlations. For example, data modeling module 116 may be configured to identify pairs of columns that are correlated with each other. In some embodiments, data modeling module 116 may be configured to identify pairs of columns that are perfectly correlated with each other. This analysis may be performed on all columns.

NLG composer 118 may be configured to analyze the inferred data generated by data modeling module 116 and may match the inferred data to an existing collection of motifs. A motif may refer to a blueprint for creating a template for the data. The blueprint may include the types of nodes that may be generated based on the data. In some embodiments, NLG composer 118 may match the inferred data to an existing set of motifs based on a specified mapping from motif fields to inputs to return a note, i.e., a collection of templates. In some embodiments, NLG composer 118 may recursively traverse through a compute graph to make an appropriate substitution in the merge fields. In some embodiments, such process can be specified by the fields themselves or overridden by various configurations. NLG executor 120 may be configured to analyze the mapped set of motifs and generate a project and template for the data. For example, NLG executor 120 may create various data variables and a template based on the mapped set of motifs.

NLG parser 122 may be configured to generate an executed report based on the data variables and the template generated by NLG executor 120. For example, based on the data variables and the template, NLG parser 122 may be configured to generate an actionable insight or note based for the data set. In some embodiments, NLG parser 122 may leverage a library to create a grammar and corresponding parser. In some embodiments, NLG parser 122 may parse the code into a structured abstract syntax tree (AST). As the AST is being built, NLG parser 122 may check the AST for static errors (e.g., invalid data types passed to a function/operator). In some embodiments, the AST may be evaluated to the result of the code.

Augmented natural language generation platform 104 may be configured to communicate with NLG database 130. NLG database 130 may be configured to store various motifs and templates for data processing.

Figure 2A:
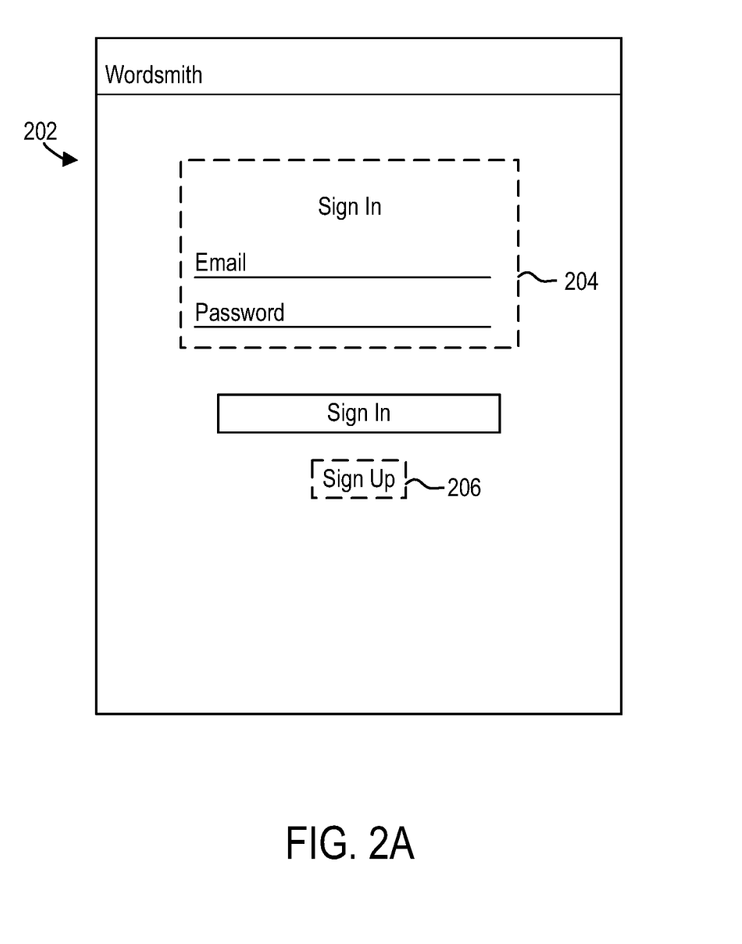
FIG. 2A illustrates a graphical user interface corresponding to a step in the process flow of augmented natural language generation, according to example embodiments.

FIG. 2A illustrates an example view of a graphical user interface 202 corresponding to a step in the process flow of augmented natural language generation, according to example embodiments. Graphical user interface 202 (hereinafter "GUI 202") may correspond to a GUI presented to a user via client device 102. In some embodiments, GUI 202 may be a web page presented in web browser 110. In some embodiments, GUI 202 may be a graphical user interface generated by data visualization application 108. Generally, GUI 202 may correspond to an interface associated with plugin 112 functionality.

As illustrated, GUI 202 may correspond to an initial log-in page for plugin 112. In some embodiments, log-in page may allow a user of client device 102 to login to their account with augmented natural language generation platform 104. For example, via one or more fields 204, a user may enter their username (e.g., email) and password and be granted access to functionality of augmented natural language generation platform 104. In some embodiments, a user of client device 102 may not have an account with augmented natural language generation platform 104. In such embodiments, a user may interact with graphical element 206, which, when actuated, prompts the user to create an account with natural language generation platform.

Figure 2B:
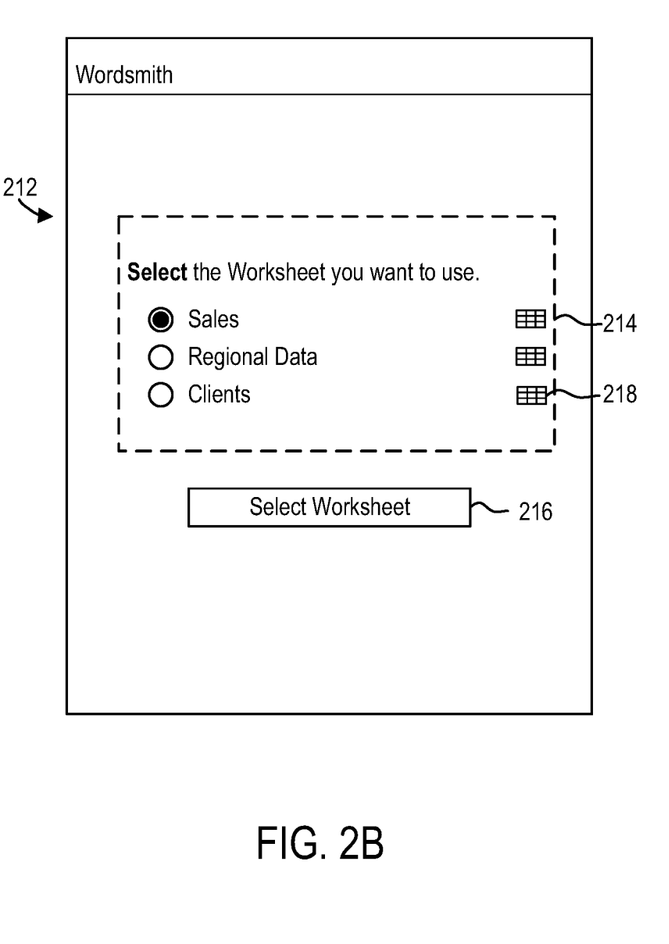
FIG. 2B illustrates a graphical user interface corresponding to a step in the process flow of augmented natural language generation, according to example embodiments.

FIG. 2B illustrates an example view of a graphical user interface 212 corresponding to a step in the process flow of augmented natural language generation, according to example embodiments. Graphical user interface 212 (hereinafter "GUI 212") may correspond to a GUI presented to a user via client device 102. In some embodiments, GUI 202 may be a web page presented in web browser 110. In some embodiments, GUI 202 may be a graphical user interface generated by data visualization application 108. Generally, GUI 202 may correspond to an interface associated with plugin 112 functionality.

As illustrated, GUI 212 may be presented to a user following authentication with augmented natural language generation platform 104. Via GUI 212, a user may be presented with possible worksheets for augmented language generation. For example, following authentication with augmented natural language generation platform 104, plugin 112 may access data associated with the user and managed by data visualization server 106. In some embodiments, plugin 112 may access user data by leveraging one or more APIs of data visualization server 106. For example, via one or more APIs of data visualization server 106, plugin 112 may be granted to access to a user's data stored in database 111. In some embodiments, the data stored in database 111 may correspond to one or more worksheets.

As shown, GUI 212 may include section 214. Section 214 may prompt the user to select a worksheet among a plurality of worksheets for natural language generation. In some embodiments, each worksheet in section 214 may include a graphical element 218 corresponding therefore. Via interaction with graphical element 218, a user may be navigated to the worksheet for review. In some embodiments, following interaction with graphical element 218, the user may be presented with an overlay window that includes a preview of the underlying worksheet.

Following selection of a worksheet for natural language generation, the user may interact with graphical element 216 to advance in the workflow.

Figure 2C:
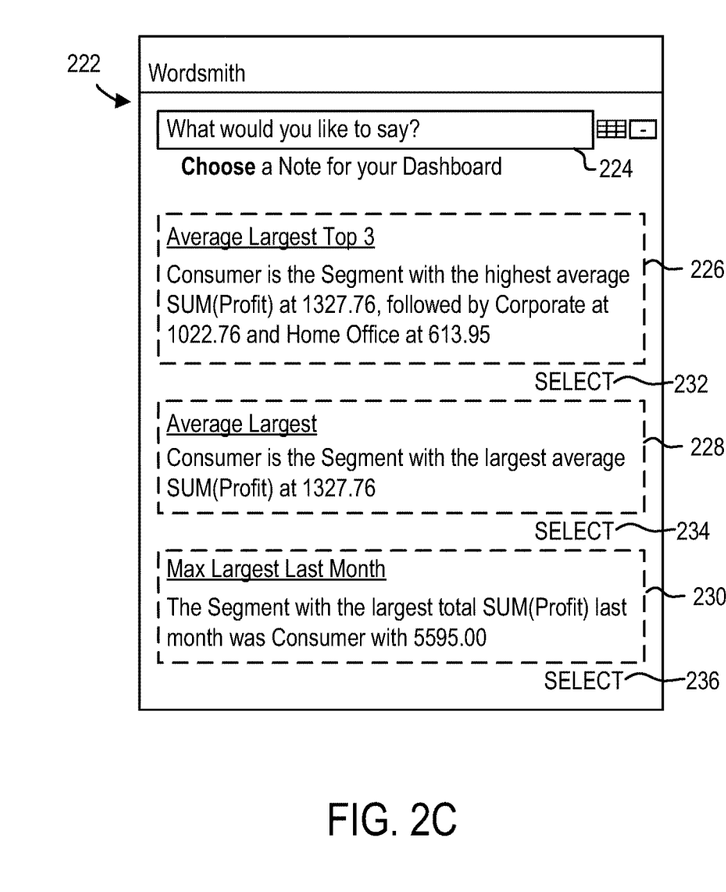
FIG. 2C illustrates a graphical user interface corresponding to a step in the process flow of augmented natural language generation, according to example embodiments.

FIG. 2C illustrates an example view of a graphical user interface 222 corresponding to a step in the process flow of augmented natural language generation, according to example embodiments. Graphical user interface 222 (hereinafter "GUI 222") may correspond to a GUI presented to a user via client device 102. In some embodiments, GUI 222 may be a web page presented in web browser 1120. In some embodiments, GUI 222 may be a graphical user interface generated by data visualization application 108. GUI 222 may correspond to an interface associated with plugin 112 functionality.

As illustrated, GUI 222 may provide the user with possible notes to be added to a user's dashboard. GUI 222 may include one or more graphical elements 224-230. Graphical element 224 may correspond to a search bar. Via graphical element 224, a user may search for possible notes based on the data provided in the worksheet. For example, in operation, following selection of a worksheet via GUI 222, augmented natural language generation platform 104 may receive access to the worksheet via one or more APIs. Once augmented natural language generation platform 104 has access to the worksheet, data modeling module 116 may analyze the worksheet and extract information for further processing. For example, data modeling module 116 may parse the worksheet and infer data column types from the worksheet. In some embodiments, data modeling module 116 may further infer detailed metadata for any columns and tables in the data set. Data modeling module 116 may provide this information to NLG composer 118

NLG composer 118 may analyze the inferred data and may match the inferred data to an existing collection of motifs to create a template for the data. NLG executor 120 may receive the matching information from NLG composer 118 and generate a note and template for the data. For example, NLG executor 120 may create various data variables and a template based on the mapped set of motifs. NLG executor 120 may provide the data variables and template to NLG parser for compilation.

NLG parser 122 may generate one or more notes 226, 228, and 230 based on the data variables and the template generated by NLG executor 120. In some embodiments, based on the data variables and the template, NLG parser 122 may generate an actionable insight or note based on data in the worksheet. For example, NLG parser 122 may selectively pull data from the worksheet based on which data corresponds to the data variables defined by NLG executor 120.

As shown, NLG parser 122 may generate a plurality of initial options to present to a user. Note 226 may correspond to a first option—"Average Largest Top 3." Based on the selected worksheet, NLG parser 122 may generate a note that reads: "Consumer is the Segment with the highest average SUM(Profit) at 1327.76, following by Corporate at 1022.76 and Home Office at 613.95." Note 228 may correspond to a second option—"Average Largest." Based on the selected worksheet, NLG parser 122 may generate a note that reads: "Consumer is the Segment with the largest SUM(Profit) at 1327.76." Note 230 may correspond to a third option—"Max Largest Last Month." Based on the selected worksheet, NLG parser 122 may generate a note that reads "The Segment with the largest total SUM(Profit) last month was Consumer with 4595.00." Each note may include an actionable element corresponding thereto. For example, as shown, actionable element 232 may correspond to note 226; actionable element 234 may correspond to note 228; and actionable element 236 may correspond to note 230. Via interaction with a respective actionable element 232-236, a user may select a respective note for display.

Figure 2D:
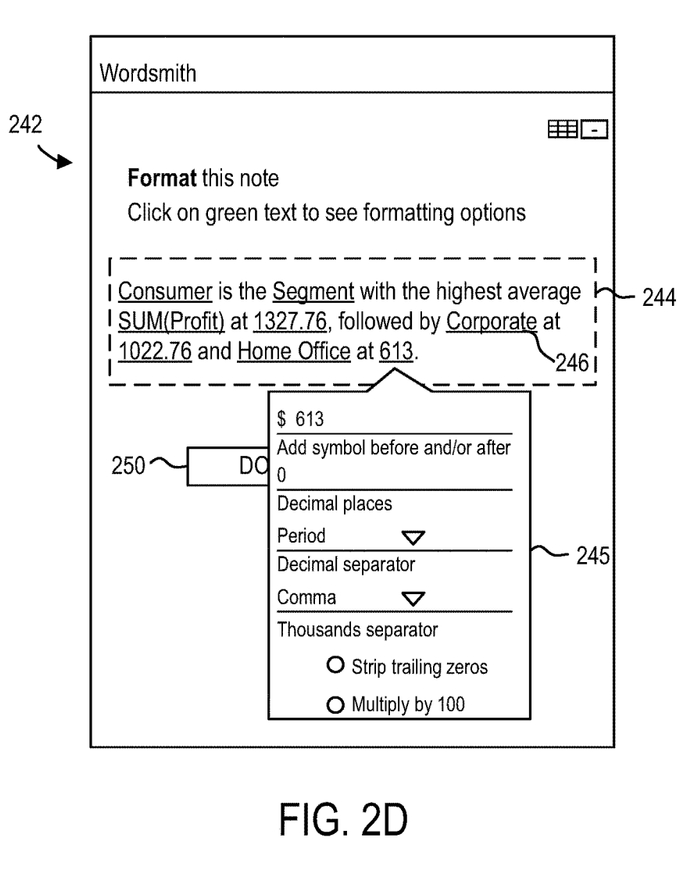
FIG. 2D illustrates a graphical user interface corresponding to a step in the process flow of augmented natural language generation, according to example embodiments.

FIG. 2D illustrates an example view of a graphical user interface 242 corresponding to a step in the process flow of augmented natural language generation, according to example embodiments. Graphical user interface 242 (hereinafter "GUI 242") may correspond to a GUI presented to a user via client device 102. In some embodiments, GUI 242 may be a web page presented in web browser 1120. In some embodiments, GUI 242 may be a graphical user interface generated by data visualization application 108. GUI 242 may correspond to an interface associated with plugin 112 functionality.

As illustrated, GUI 242 may allow a user to edit the generated note. GUI 242 may include actionable item 244. Actionable item 244 may correspond to a narrative framework of the selected note from GUI 232. For example, the representation of selected note may be composed of one or more phrase variations 246. Each phrase variation may correspond to an item of data from the selected worksheet. Each phrase variation 246 may be actionable. For example, upon interacting with a phrase variation 246, a user may be presented with an overlay or pop-up window 245. Overlay or pop-up window 245 may include one or more format options for the selected phrase variation 246. For example, as shown, the user may interact with "613" to vary the way the data in phrase variation 246 is selected. In some embodiments, the user may add a dollar symbol in front of the number, define the number of decimal places, indicate the type of symbol used as a decimal separator, indicate if trailing zeros should be stripped, indicate if the value should be multiplied by 100, and the like. Once the note is tailored to the user's liking, a user may interact with actionable element 250 to accept the changes.

Figure 2E:
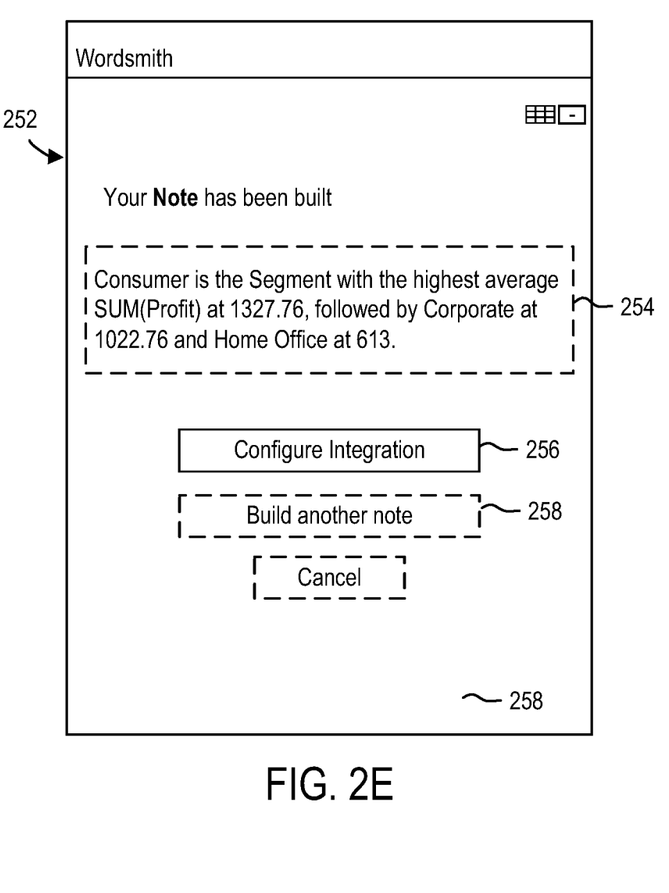
FIG. 2E illustrates a graphical user interface corresponding to a step in the process flow of augmented natural language generation, according to example embodiments.

FIG. 2E illustrates an example view of a graphical user interface 252 corresponding to a step in the process flow of augmented natural language generation, according to example embodiments. Graphical user interface 252 (hereinafter "GUI 252") may correspond to a GUI presented to a user via client device 102. In some embodiments, GUI 252 may be a web page presented in web browser 110. In some embodiments, GUI 252 may be a graphical user interface generated by data visualization application 108. GUI 252 may correspond to an interface associated with plugin 112 functionality.

As illustrated, GUI 252 may include graphical element 254. Graphical element 254 may include a representation of the approved note based on the narrative framework approved in GUI 242. GUI 252 may further include actionable element 256 and actionable element 258. Actionable element 256 may prompt the user to configurate the integration. Actionable element 258 may prompt the user to build another note. For example, following interaction with actionable element 258, a user may return to GUI 222 for selecting another note.

Figure 2F:
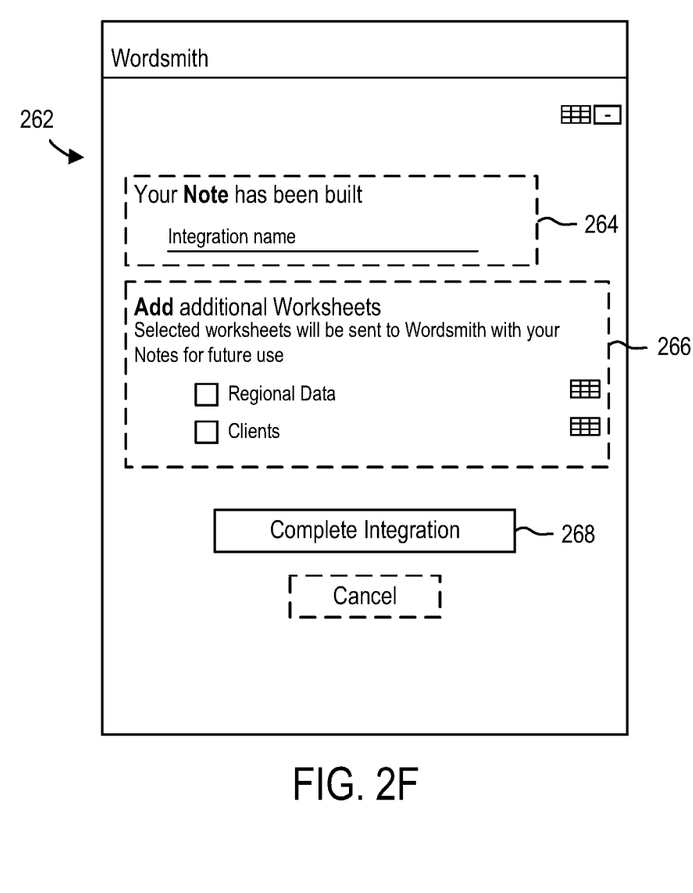
FIG. 2F illustrates a graphical user interface corresponding to a step in the process flow of augmented natural language generation, according to example embodiments.

FIG. 2F illustrates an example view of a graphical user interface 262 corresponding to a step in the process flow of augmented natural language generation, according to example embodiments. Graphical user interface 262 (hereinafter "GUI 262") may correspond to a GUI presented to a user via client device 102. In some embodiments, GUI 262 may be a web page presented in web browser 110. In some embodiments, GUI 262 may be a graphical user interface generated by data visualization application 108. GUI 262 may correspond to an interface associated with plugin 112 functionality.

As illustrated, GUI 262 may include graphical element 264 and graphical element 266. Graphical element 264 may allow a user to name their integration. For example, the user can name the integration so that the user can refer back to the integration should the user wish to edit or modify the narrative framework. Graphical element 266 may allow a user to add additional worksheets to the integration. For example, as shown, graphical element 266 may include one or more prompts seeking user input to add additional worksheets. To complete the integration, a user may interact with graphical element 268.

Figure 3:
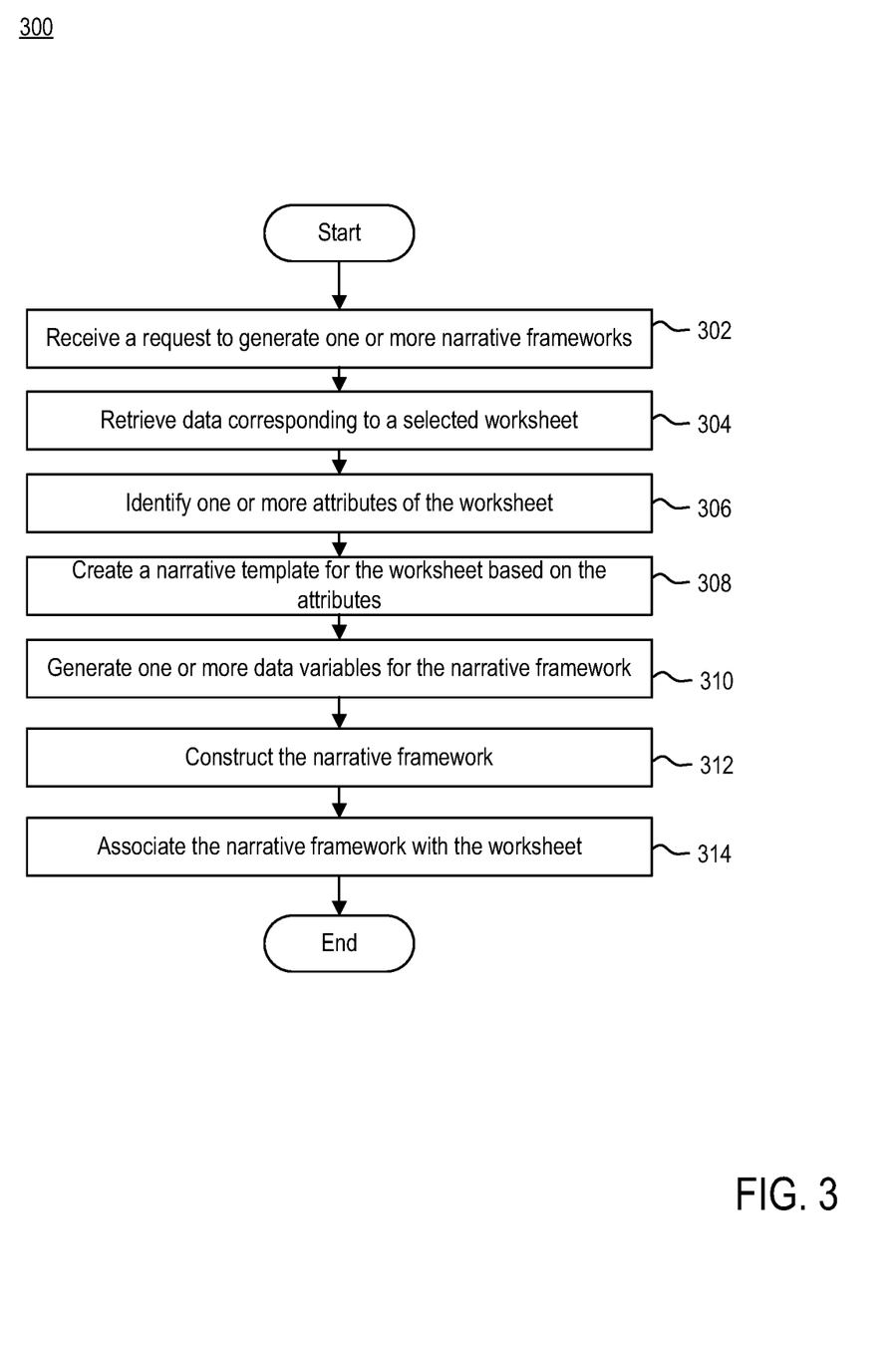
FIG. 3 is a flow diagram illustrating a method of creating a report for a data sheet, according to example embodiments.

FIG. 3 is a flow diagram illustrating a method 300 of generating a narrative framework, according to example embodiments. Method 300 may begin at step 302.

At step 302, augmented natural language generation platform 104 may receive a request to generate one or more narrative frameworks for a worksheet. In some embodiments, augmented natural language generation platform 104 may receive a request from a plugin 112 executing with data visualization application 108 on client device 102.

At step 304, augmented natural language generation platform 104 may retrieve data corresponding to the worksheet from data visualization server 106. For example, augmented natural language generation platform 104 may perform an API call to retrieve the identified worksheet.

At step 306, augmented natural language generation platform 104 may identify one or more attributes of the worksheet. In some embodiments, data modeling module 116 may analyze the worksheet and extract information for further processing. For example, data modeling module 116 may parse the worksheet and infer data column types from the worksheet. In some embodiments, data modeling module 116 may further infer detailed metadata for any columns and tables in the data set. Data modeling module 116 may provide this information to NLG composer 118.

At step 308, augmented natural language generation platform 104 may create a narrative template for the worksheet, based on the attributes of the worksheet. In some embodiments, NLG composer 118 may analyze the inferred data. Using the inferred data, NLG composer may match the inferred data to an existing collection of motifs to create a template for the data. NLG composer 118 may provide this information to NLG executor 120.

At step 310, augmented natural language generation platform 104 may generate one or more data variables for the note. For example, NLG executor 120 may receive the matching information from NLG composer 118 and generate one or more data variables and template for the data. For example, NLG executor 120 may create various data variables and a template based on the mapped set of motifs. NLG executor 120 may provide the data variables and template to NLG parser for compilation.

At step 312, augmented natural language generation platform 104 may generate a finished note based on the one or more data variables and the template. For example, NLG parser 122 may generate narrative framework based on the data variables and the template generated by NLG executor 120. In some embodiments, based on the data variables and the template, NLG parser 122 may generate a narrative framework for the note based on data in the worksheet. For example, NLG parser 122 may selectively pull data from the worksheet based on which data corresponds to the data variables defined by NLG executor 120.

At step 314, augmented natural language generation platform 104 may associate the narrative framework with the worksheet. For example, if data in the selected worksheet changes over time, NLG executor 120 may be configured to update the values of the data variables based on the change. In some embodiments, when the notes are generated, a corresponding integration and project may be created and stored in database 130. For example, when worksheet data changes, the new data may be passed through the corresponding integration to update data variables in the notes.

Figure 4A:
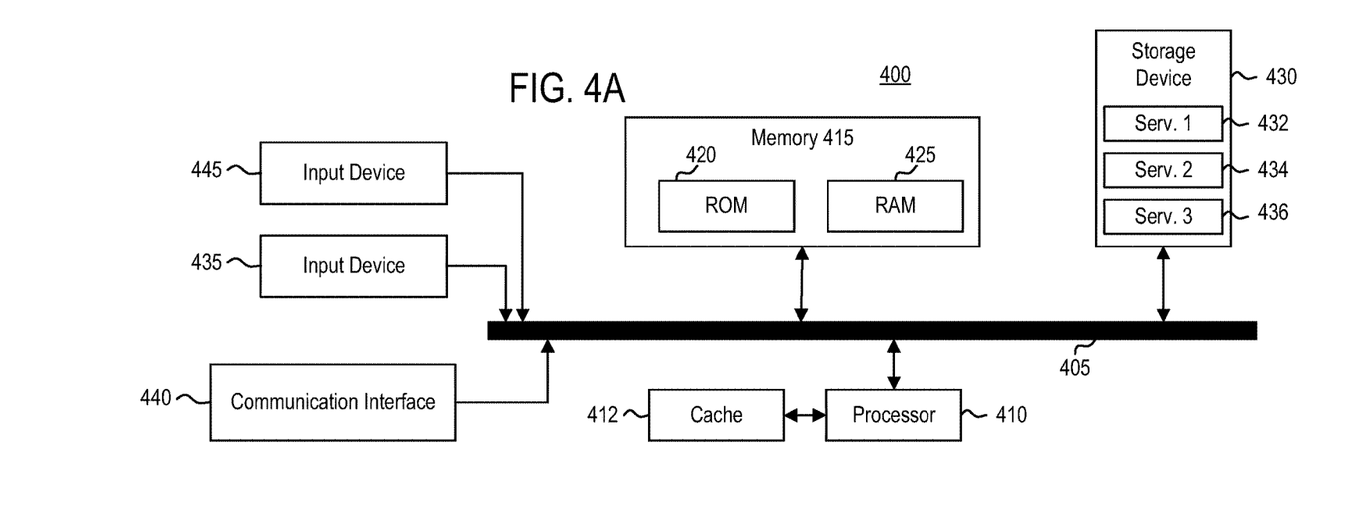
FIG. 4A is a block diagram illustrating a computing device, according to example embodiments.

FIG. 4A illustrates a system bus computing system architecture 400, according to example embodiments. System 400 may be representative of at least a portion of augmented natural language generation platform 104. One or more components of system 400 may be in electrical communication with each other using a bus 405. System 400 may include a processing unit (CPU or processor) 410 and a system bus 405 that couples various system components including the system memory 415, such as read only memory (ROM) 420 and random access memory (RAM) 425, to processor 410. System 400 may include a cache of high-speed memory connected directly with, in close proximity to, or integrated as part of processor 410. System 400 may copy data from memory 415 and/or storage device 430 to cache 412 for quick access by processor 410. In this way, cache 412 may provide a performance boost that avoids processor 410 delays while waiting for data. These and other modules may control or be configured to control processor 410 to perform various actions. Other system memory 415 may be available for use as well. Memory 415 may include multiple different types of memory with different performance characteristics. Processor 410 may include any general-purpose processor and a hardware module or software module, such as service 1 432, service 2 434, and service 3 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing device 400, an input device 445 may represent any number of input mechanisms, such as a microphone for speech, a touch-sensitive screen for gesture or graphical input, keyboard, mouse, motion input, speech and so forth. An output device 435 may also be one or more of a number of output mechanisms known to those of skill in the art. In some instances, multimodal systems may enable a user to provide multiple types of input to communicate with computing device 400. Communications interface 440 may generally govern and manage the user input and system output. There is no restriction on operating on any particular hardware arrangement and therefore the basic features here may easily be substituted for improved hardware or firmware arrangements as they are developed.

Storage device 430 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 425, read only memory (ROM) 420, and hybrids thereof.

Storage device 430 may include services 432, 434, and 436 for controlling the processor 410. Other hardware or software modules are contemplated. Storage device 430 may be connected to system bus 405. In one aspect, a hardware module that performs a particular function may include the software component stored in a computer-readable medium in connection with the necessary hardware components, such as processor 410, bus 405, display 435, and so forth, to carry out the function.

Figure 4B:
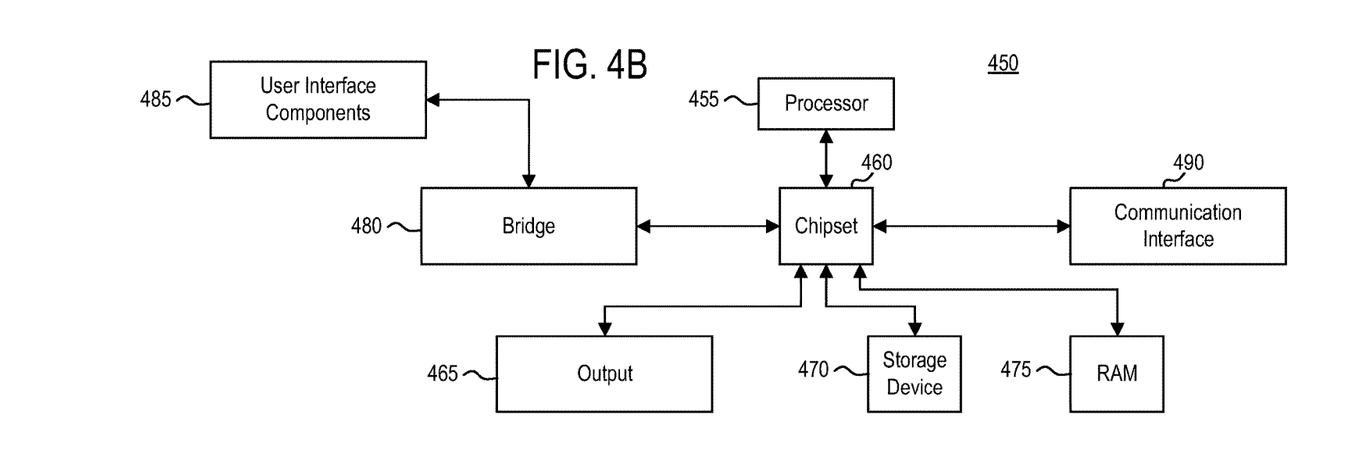
FIG. 4B is a block diagram illustrating a computing device, according to example embodiments.

FIG. 4B illustrates a computer system 450 having a chipset architecture that may represent at least a portion of augmented natural language generation platform 104. Computer system 450 may be an example of computer hardware, software, and firmware that may be used to implement the disclosed technology. System 450 may include a processor 455, representative of any number of physically and/or logically distinct resources capable of executing software, firmware, and hardware configured to perform identified computations. Processor 455 may communicate with a chipset 460 that may control input to and output from processor 455. In this example, chipset 460 outputs information to output 465, such as a display, and may read and write information to storage device 470, which may include magnetic media, and solid state media, for example. Chipset 460 may also read data from and write data to RAM 475. A bridge 480 for interfacing with a variety of user interface components 485 may be provided for interfacing with chipset 460. Such user interface components 485 may include a keyboard, a microphone, touch detection and processing circuitry, a pointing device, such as a mouse, and so on. In general, inputs to system 450 may come from any of a variety of sources, machine generated and/or human generated.

Chipset 460 may also interface with one or more communication interfaces 490 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 455 analyzing data stored in storage 470 or 475. Further, the machine may receive inputs from a user through user interface components 485 and execute appropriate functions, such as browsing functions by interpreting these inputs using processor 455.

It may be appreciated that example systems 400 and 450 may have more than one processor 410 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
receiving, by a computing system, a request to generate a narrative framework for a worksheet hosted by a third party server, the narrative framework comprising a phrase that comprises data associated with the worksheet;
interfacing, by the computing system, with the third party server to retrieve the data associated with the worksheet;
inferring, by the computing system, attributes of the worksheet from the retrieved data, the attributes corresponding to a type of data represented in the worksheet;
generating, by the computing system, a narrative template for the narrative framework based on the attributes of the worksheet by matching the inferred attributes of the worksheet to a collection of motifs that define data fields for the narrative template;
generating, by the computing system, one or more data variables for the narrative template based on the matched collection of motifs; and
constructing, by the computing system, the narrative framework by selectively retrieving data values from the worksheet and inputting the data values into the one or more data variables of the narrative template to form the phrase of the narrative framework.

2. The method of claim 1, wherein the request to generate the narrative framework is received from a plugin executing with a data visualization application on a client device.

3. The method of claim 1, wherein interfacing, by the computing system, with the third party server to retrieve data associated with the worksheet comprises interfacing with the third party server via one or more application programming interfaces (APIs) linking the computing system to the third party server.

4. The method of claim 1, further comprising:
receiving, by the computing system, a request to modify a value of a data variable of the one or more data variables in the narrative framework; and
updating, by the computing system, the data variable of the one or more data variables based on the request.

5. The method of claim 1, further comprising:
receiving, by the computing system from the third party server, an update to the worksheet;
identifying, by the computing system, that the update to the worksheet changes a value of a data variable of the one or more data variables in the narrative framework; and updating, by the computing system, the narrative framework based on the update to the worksheet.

6. The method of claim 1, wherein inferring, by the computing system, the attributes of the worksheet from the retrieved data comprises:
inferring a data type associated with each column of data in the worksheet.

7. A non-transitory computer readable medium comprising instructions which, when executed by a computing system, cause the computing system to perform operations comprising:
receiving, by the computing system, a request to generate a narrative framework for a worksheet hosted by a third party server, each of the narrative framework comprising a phrase that comprises data associated with the worksheet;
interfacing, by the computing system, with the third party server to retrieve data associated with the worksheet;
inferring, by the computing system, attributes of the worksheet from the retrieved data, the attributes corresponding to a type of data represented in the worksheet;
generating, by the computing system, a narrative template for the narrative framework based on the attributes of the worksheet by matching the inferred attributes of the worksheet to a collection of motifs;
generating, by the computing system, one or more data variables for the narrative template; and
constructing, by the computing system, the narrative framework by selectively retrieving data values from the worksheet and inputting the data values into the one or more data variables of the narrative template to form the phrase of the narrative framework.

8. The non-transitory computer readable medium of claim 7, wherein the request to generate the narrative framework is received from a plugin executing with a data visualization application on a client device.

9. The non-transitory computer readable medium of claim 7, wherein interfacing, by the computing system, with the third party server to retrieve data associated with the worksheet comprises interfacing with the third party server via one or more application programming interfaces (APIs) linking the computing system to the third party server.

10. The non-transitory computer readable medium of claim 7, further comprising:
receiving, by the computing system, a request to modify a value of a data variable of the one or more data variables in the narrative framework; and
updating, by the computing system, the data variable of the one or more data variables based on the request.

11. The non-transitory computer readable medium of claim 7, further comprising:
receiving, by the computing system from the third party server, an update to the worksheet;
identifying, by the computing system, that the update to the worksheet changes a value of a data variable of the one or more data variables in the narrative framework; and
updating, by the computing system, the narrative framework based on the update to the worksheet.

12. The non-transitory computer readable medium of claim 7, wherein inferring, by the computing system, the attributes of the worksheet from the retrieved data comprises:
inferring a data type associated with each column of data in the worksheet.

13. A system comprising:
a processor; and
a memory having programming instructions stored thereon, which, when executed by the processor, performs operations comprising:
receiving a request to generate a narrative framework for a worksheet hosted by a third party server, the narrative framework comprising a phrase that comprises data associated with the worksheet;
interfacing with the third party server to retrieve data associated with the worksheet;
inferring attributes of the worksheet from the retrieved data, the attributes corresponding to a type of data represented in the worksheet;
generating a narrative template for the narrative framework based on the attributes of the worksheet by matching the inferred attributes of the worksheet to a collection of motifs;
generating one or more data variables for the generated narrative template; and
constructing the narrative framework by selectively retrieving data values from the worksheet and inputting the data values into the one or more data variables of the narrative template to form the phrase of the narrative framework.

14. The system of claim 13, wherein the request to generate the narrative framework is received from a plugin executing with a data visualization application on a client device.

15. The system of claim 13, wherein interfacing with the third party server to retrieve data associated with the worksheet comprises interfacing with the third party server via one or more application programming interfaces (APIs) linking the system to the third party server.

16. The system of claim 13, wherein the operations further comprise:
receiving a request to modify a value of a data variable of the one or more data variables in the narrative framework; and
updating the data variable of the one or more data variables based on the request.

17. The system of claim 13, wherein the operations further comprise:
receiving, from the third party server, an update to the worksheet;
identifying that the update to the worksheet changes a value of a data variable of the one or more data variables in the narrative framework; and
updating the narrative framework based on the update to the worksheet.

18. The system of claim 13, wherein inferring the attributes of the worksheet from the retrieved data comprises:
inferring a data type associated with each column of data in the worksheet.

* * * * *